H. R. WEBSTER.
GAS DETECTING APPARATUS.
APPLICATION FILED APR. 12, 1915.

1,174,370.

Patented Mar. 7, 1916.
2 SHEETS—SHEET 1.

Frederick Atkinson.
J. Clark Jefferson.
} Witnesses

Henry Roberts Webster
Inventor.

H. R. WEBSTER.
GAS DETECTING APPARATUS.
APPLICATION FILED APR. 12, 1915.

1,174,370.

Patented Mar. 7, 1916.
2 SHEETS—SHEET 2.

UNITED STATES PATENT OFFICE.

HENRY ROBERTS WEBSTER, OF LEEDS, ENGLAND.

GAS-DETECTING APPARATUS.

1,174,370.   Specification of Letters Patent.   Patented Mar. 7, 1916.

Application filed April 12, 1915. Serial No. 20,711.

*To all whom it may concern:*

Be it known that I, HENRY ROBERTS WEBSTER, a subject of the King of Great Britain and Ireland, residing at Leeds, in the county of York, England, have invented certain new and useful Improvements in Gas-Detecting Apparatus, of which the following is a specification.

This invention relates to apparatus for detecting and indicating the presence and proportion of a gas in an admixture of air and gas or other gases, and more particularly for indicating the presence and percentage of fire damp, (methane), in the atmosphere of mines.

The type of apparatus to which this invention refers, is based on the principle of differential diffusion through the porous walls of a vessel, containing air and surrounded by a gas or admixture of gases; the lighter gas or gases penetrating more rapidly through the porous walls into the interior of the vessel than the opposite movement of air to the outside of the vessel; so that a pressure or increase of pressure occurs inside the vessel, which by means of a flexible diaphragm is utilized to actuate the pointer of an indicator. Now I have discovered, that such apparatus are liable to be influenced by disturbing causes met with in mines, so that the indications are not always correct. Such disturbing causes are :—the presence of other gases than the one being tested for, *e. g.* carbonic acid and water vapor, a sudden change of temperature or barometric pressure, the exposure of the apparatus to strong air currents, the taking of two readings in quick succession and coal-and stone dust in the atmosphere of the mine.

Now the object of this invention is to render such apparatus immune to such disturbing causes. And in order that my invention and the manner in which the same is to be performed may be more readily and clearly understood, I have annexed hereto the accompanying two sheets of drawings of a detecting and indicating apparatus constructed in accordance with this invention.

Figure 1:
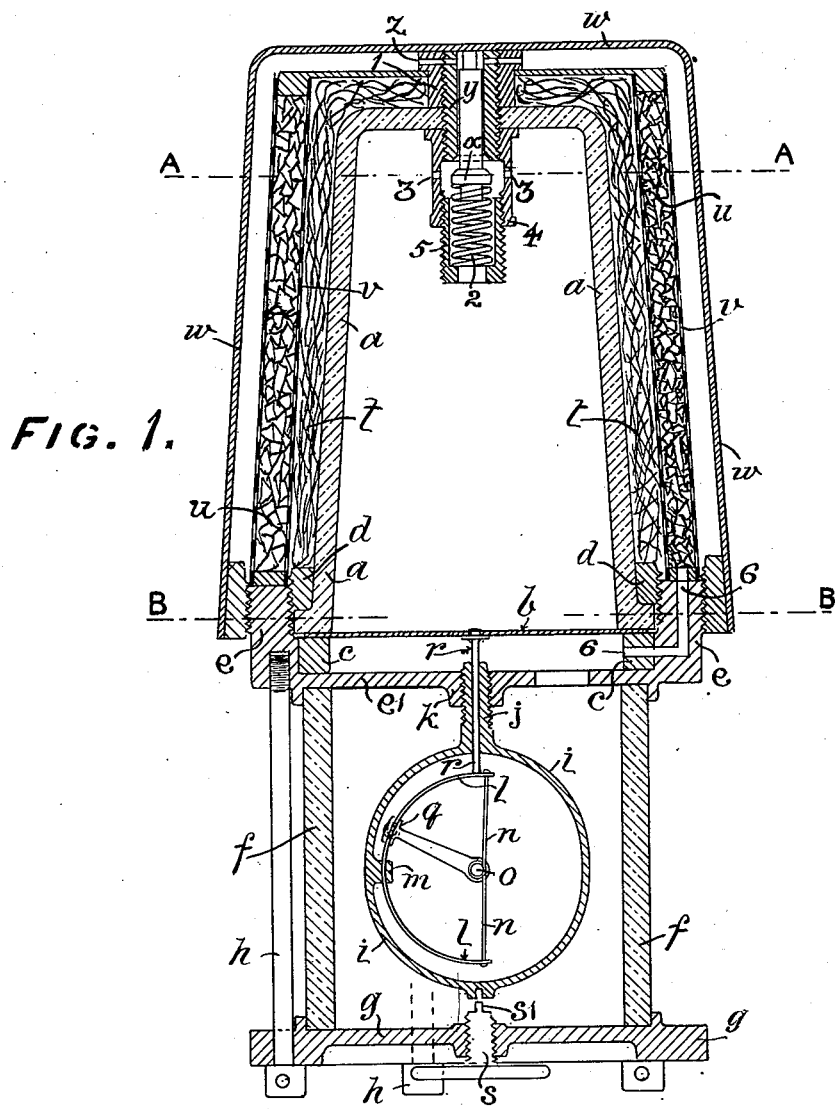
Figure 2:
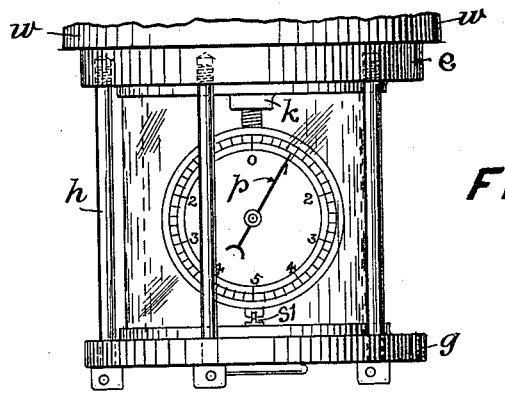
Figure 3:
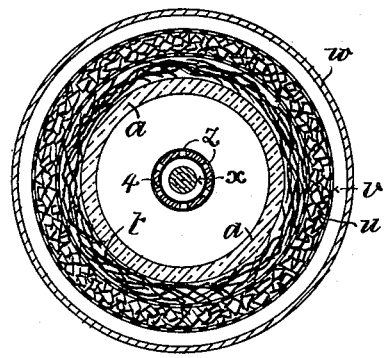
Figure 4:
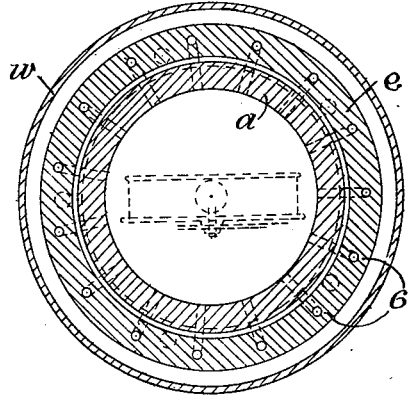

Figure 1 is a vertical section. Fig. 2 is an outside elevation of the lower part of Fig. 1. Figs. 3 and 4 are horizontal sections on lines AA, and BB respectively of Fig. 1.

$a$, is the porous vessel, the lower end of which is closed by a sufficiently flexible diaphragm $b$, held in position by the supporting ring $c$, and the tightening ring $d$; the ring $d$ being screwed into the upper part of the upstanding rim $e$ of the disk $e^1$.

$f$ is a thick glass cylinder, held air tight between the disk $e^1$, and the bottom plate or disk $g$, by means of the tightening rods or bolts $h$. The disk $e^1$, may be perforated, so as to communicate from the underside of the diaphragm with the interior of the glass cylinder.

The glass cylinder $f$ incloses the detecting and indicating device, which, as shown, comprises a casing $i$, suspended by the screwed projection $j$, the latter screwing into the central boss $k$ of the top disk $e^1$.

$l$, is a semi-circular flat spring, held at its center by the lug $m$, on the inside of the casing $i$, and having its two ends connected by a flexible cord $n$, or the like, which is under tension produced by the two halves of the spring $l$. The cord $n$ passes around the spindle $o$ of the indicator pointer $p$.

$q$ is a slotted block carried by a lever pivoted on the spindle $o$, and which can be moved to adjust the stiffness of the spring $l$.

$r$ is a rod attached to the diaphragm $b$, and transmits any downward movement of the diaphragm $b$ to the upper end of the spring $l$.

$s$ is a screw terminating in a flat cross piece $s^1$, adapted to engage with a notch or recess on the outside of the bottom of the casing $i$; whereby the latter may be rotated so as to adjust its position with reference to the diaphragm.

The indicating mechanism as just described is the subject matter of British Patent No. 29094 of 1913, and is more fully described in the specification of said patent. The means for actuating the pointer are not essential to the present invention.

According to this invention, the air containing receptacle or vessel $a$ having a porous body or inclosing wall is surrounded by a layer $t$, of cotton wool, asbestos fiber, glass wool or the like, for the double purpose of neutralizing the influence of strong air currents, which tend to retard diffusion outward from the porous vessel, and to prevent the blocking of the pores of the vessel $a$ by coal or stone dust. Also the vessel $a$ is surrounded by a layer or layers of caustic potash or, a mixture of caustic potash and lime, calcic chlorid, carbonate of soda or other substances capable of absorbing moisture, (which might block the pores of the vessel $a$,) or absorbing carbonic acid or carbonic oxid, the presence of which as an admixture would otherwise give a different rate of diffusion to that due to the presence of methane or fire damp alone, or of other gas the object of the test. This layer is perhaps most conveniently carried between cylinders $v$, of wire gauze.

When it is desired to keep the contents of the porous vessel $a$ constant during the interval between the taking of two readings, or while the apparatus is being carried from one portion of a mine to another, a metal cover $w$, is provided, which can be screwed down air tight on the outside of the rim $e$, so as to inclose the porous vessel $a$ and any layers as just described surrounding it. The cover is removed immediately prior to taking an observation.

An air or air and gas space is left between the two layers $t$ and $u$ or as shown between the outer layer and the metal cover $w$. The layer $u$ of chemical absorbents is preferably placed next the cover $w$, so as to be removable therewith.

$x$ is a spring pressed relief valve, the stem of which is fluted or made smaller than the opening through the plug $y$, so as to allow air to pass from the said air or air and gas space through the ports $z$ in the screwed sleeve $l$, which tightens down on the top of the porous vessel, and down the passage around the stem of the valve $x$. The spring 2 is compressed by the pressure of the top of the metal cover $w$ on the upper end of the valve stem or spindle when the cover is screwed down into position, and thus opens the interior of the vessel $a$ to the air or air and gas space within the cap or cover, the air or gas passing through holes 3 in the wall of the valve chamber 4.

5 is the spring chamber.

6 are bypasses allowing air to pass from said space into the space between the diaphragm $b$ and the disk $e^1$. Thus when the relief valve $x$ is opened, equilibrium of pressure on the two sides of the diaphragm is at once established.

The apparatus is used in a return air passage or other part of a mine or in any other place where there is need to discover the presence of fire damp or other gas lighter or heavier than air so that its rate of diffusion is different from that of pure air through an intervening porous wall. The admission of air as above described to the interior of the porous receptacle $a$ is effected before the exposure of said receptacle to the atmosphere which is to be tested. The metal cover $w$ is kept on it until the proper place for such test is reached or until conditions seem to require the test. In such circumstances there is only the normal pressure of the air within the apparatus and the indicator may be arranged to stand then at zero. Instead of the contained air, another gas or mixture of air and gas may be used, the density and penetrative quality of the same being known, and serving as the normal or starting point of the test. The cover $w$ is then removed and the operation proceeds, as is usual in such apparatus, by the infiltration of the fire-damp or other gas or gases through the porous receptacle $a$ and the consequent increase or decrease of pressure on the diaphragm $b$. The greater or less movement of the indicator will show the proportion of fire-damp or other gas or gases to air in the atmosphere of the mine. If there be no movement of the indicator, there is no fire-damp or other gas or gases. During this operation the protective coverings, as already explained, guard the porous receptacle $a$ against drafts, carbonic acid, the clogging of the pores by dust or moisture, variations of temperature and barometric pressure and in general from disturbing influences which would vitiate the indication and make the test unreliable.

After a reading this may be preserved until the next and the apparatus may be held or carried unchanged, by screwing the cover into place. This will cut off all external air and gas. It will also open valve $x$ if screwed home, establishing communication between the interior of the receptacle and the space just within the cover as already explained; but need not be screwed on far enough to affect said valve, though covering and hermetically closing the apparatus.

Having now described my invention, I declare that what I claim is:—

1. In an apparatus for detecting and indicating the presence and proportion of gas in an admixture of air and gas, the combination with a porous vessel having a flexible diaphragm connected to an indicator, of a surrounding layer of chemical absorbent, a surrounding layer of dust stopping material and a removable metallic cover exterior to said layers substantially as set forth.

2. In combination with a vessel having a hollow porous air-containing or gas containing body, a diaphragm arranged to be acted on by gas within said vessel, indicating means operated by said diaphragm and surrounding layers of dust-stopping material and chemical absorbent, the said body of the vessel being adapted to allow the passage of gas through it into the interior of said hollow porous body on several sides substantially as set forth.

3. In an apparatus for detecting and indicating the presence of gas in air, the combination of a vessel adapted to admit gas to the contained air, with a flexible diaphragm arranged to be acted on by such gas, an indicator actuated by said diaphragm, a movable cover arranged to leave an air space between it and the body of the vessel, means providing a passage from said space to the interior of said vessel and a valve governing said passage and arranged to be opened by the application of said cover, for the admission of air from said space to said interior.

4. In apparatus for indicating the presence of gas in air, a receptacle having a hollow inverted porous air-containing body, a movable diaphragm arranged to be acted on by gas in the interior of said body and a layer of dust-excluding material fitting on said body, said layer and said body being adapted to allow the flow of gas into the interior of the latter from all sides except that occupied by said diaphragm.

5. In a diffusion apparatus for detecting and indicating the presence and proportion of a gas in an admixture of air and gas, the combination with a porous vessel of a chemical absorbent and inclosing gauze cylinders surrounding said vessel and a removable outer metal cover, substantially as set forth.

6. In a gas-detecting apparatus, a porous receptacle adapted to permit the passage of gas through its wall, an air inlet valve and a removable cover arranged to act on the stem of said valve to open the latter and leave an air space immediately within said cover whence air may flow into said receptacle to prepare the same for gas-detecting use.

7. In a gas-detecting apparatus, a porous receptacle, an air-inlet valve therein and an external cover adapted to engage said valve and having screw-threaded engagement permitting it at will to be removed, or turned so as to be held air-tight in its place, keeping the internal conditions unchanged, or turned sufficiently to open said valve while maintaining such closure.

8. In a diffusion apparatus for detecting and indicating the presence and proportion of a gas in an admixture of air and gas, the combination of an air receptacle having a porous wall admitting gas into it on several sides, a layer of dust-stopping material surrounding said vessel and an outer inclosing removable metal cover substantially as set forth.

9. In a diffusion apparatus for detecting and indicating the presence and proportion of a gas in an admixture of air and gas, the combination with an air-containing or gas containing vessel which is porous on all sides for the passage of gas through it, of a surrounding layer of chemical absorbent and indicating means operated by gas in said vessel substantially as set forth.

10. In an apparatus for indicating the presence of gas in air, a receptacle having a hollow body adapted to contain air or gas, but porous on several sides to permit the passage through it of air or gas when the gaseous bodies on the outside and the inside of it are of different specific gravity, a movable diaphragm arranged within said receptacle to be acted on by gaseous pressure and an indicator arranged to be operated by the movement of said diaphragm in either direction substantially as set forth.

11. In an apparatus for measuring the proportion of gas and air, a receptacle having a hollow body adapted to contain air or gas and porous on several sides to permit the passage through it either inwardly or outwardly of air or gas when the gaseous bodies outside of it and inside of it are of different specific gravity, a movable diaphragm arranged within said receptacle to be acted on by gaseous pressure and a graduated indicator, the movable part of which is operatively connected to said diaphragm and caused to travel over such graduations when said diaphragm moves in either direction substantially as set forth.

In testimony whereof, I have signed my name to this specification in the presence of two subscribing witnesses.

HENRY ROBERTS WEBSTER.

Witnesses:
FREDERICK ATKINSON,
J. CLARK JEFFERSON.